(12) United States Patent
Sentmanat

(10) Patent No.: US 7,033,067 B2
(45) Date of Patent: Apr. 25, 2006

(54) CASCADING ORIFICE MIXER

(75) Inventor: Martin Lamar Sentmanat, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 74 days.

(21) Appl. No.: 10/331,524

(22) Filed: Dec. 30, 2002

(65) Prior Publication Data

US 2004/0125690 A1 Jul. 1, 2004

(51) Int. Cl.
*B29B 7/06* (2006.01)

(52) U.S. Cl. .................... 366/76.7; 366/91; 366/176.3; 366/268

(58) Field of Classification Search .. 366/176.1–176.4, 366/76.7, 91, 96, 267, 268, 340, 341
See application file for complete search history.

(56) References Cited

U.S. PATENT DOCUMENTS

| | | | | |
|---|---|---|---|---|
| 2,865,371 | A | * 12/1958 | Dorbecker et al. | ......... 604/143 |
| 3,860,218 | A | 1/1975 | Hurlimann | |
| 4,062,524 | A | * 12/1977 | Brauner et al. | ............. 366/340 |
| 4,334,783 | A | 6/1982 | Suzaka | |
| 4,334,787 | A | 6/1982 | Kluth et al. | |
| 4,385,840 | A | 5/1983 | Wisneski | |
| 4,490,046 | A | * 12/1984 | Guibert | ..................... 366/76.4 |
| 5,158,725 | A | 10/1992 | Handa et al. | |
| 5,302,018 | A | 4/1994 | Maeda | |
| 5,451,106 | A | 9/1995 | Nguyen et al. | |
| 5,711,904 | A | 1/1998 | Eswaran et al. | |
| 5,749,653 | A | 5/1998 | Kurtz | |
| 5,823,671 | A | 10/1998 | Mitchell et al. | |
| 5,904,422 | A | 5/1999 | Kurtz | |
| 5,968,018 | A | 10/1999 | Freeman et al. | |
| 6,051,630 | A | 4/2000 | Serafin et al. | |
| 6,062,722 | A | 5/2000 | Lake | |
| 6,079,866 | A | 6/2000 | Keulen et al. | |
| 6,220,747 | B1 | 4/2001 | Gosselin | |
| 6,252,016 | B1 | 6/2001 | Wu et al. | |
| 6,354,729 | B1 | 3/2002 | Brown | |
| 6,372,822 | B1 | 4/2002 | Chung et al. | |
| 6,383,372 | B1 | 5/2002 | Houck et al. | |
| 6,422,733 | B1 | 7/2002 | Adams et al. | |
| 6,799,884 | B1 | * 10/2004 | Sentmanat | ............... 366/176.3 |
| 2002/0104851 | A1 | 8/2002 | Parise | |

* cited by examiner

*Primary Examiner*—David Sorkin
(74) *Attorney, Agent, or Firm*—Thompson Hine LLP

(57) ABSTRACT

A cascading orifice mixer for mixing a viscoelastic material comprising a plurality of chambers connected in series, including a first chamber, at least one intermediate chamber and a last chamber, each chamber including an orifice providing fluid communication between adjacent chambers thereby defining a substantially unidirectional sequential flow path through the chambers is disclosed. Each chamber has a variable volume ranging from a minimum volume to a maximum volume and the chambers are adapted to transport the viscoelastic material along the sequential flow path by transporting the viscoelastic material from a filled chamber containing a quantity of the viscoelastic material to a next adjacent empty chamber wherein the filled chamber and the next adjacent chamber are each at or near the maximum volume for the respective chamber. The volume in the filled chambers is reduced to the minimum volume thereby forcing the viscoelastic material through the respective filled chamber orifice and into the next adjacent chamber. The process for mixing a viscoelastic material utilizing a cascading orifice mixer is also described.

21 Claims, 4 Drawing Sheets

CASCADING ORIFICE MIXER

TECHNICAL FIELD

The present invention relates to an apparatus and process for mixing viscoelastic materials. More particularly, the invention relates to a semi-continuous process for mixing viscoelastic materials utilizing a cascading orifice mixer in which the primary mode of dispersive deformation is in extension.

BACKGROUND OF THE INVENTION

Mechanical mixers typically used in the polymer and rubber industries primarily rely on shear as the primary mode of dispersive deformation. In these types of dispersive mixers, rotors or stirrers are typically used to disperse ingredients within the primary matrix. The majority of mixing processes known in the art, such as those done with Banbury batch mixers and twin screw mixers employ the rotating action of a screw or rotors as the major energy input to the system to mix materials. Because of such rotating action, these processes subject materials to a high level of shear flows as opposed to extensional flows. The high levels of shear flows in these processes have two results. First, such processes are relatively energy inefficient, and shear flows contribute to significant energy dissipation and rapid heat rise in the system being mixed, thus often limiting the amount of mixing that is possible without degrading the material. Mixing processes that rely on simple shear flow require several orders of magnitude more energy than those that rely on extensional flow to achieve the same level of mixing. Second, the dispersive mixing capability based on the shear flow component of these mixing processes is poor. It is known that extensional flows, on the other hand, are much better at breaking up inhomogeneities in a material than shear flows and are therefore much better at dispersive mixing. In fact, it is the extensional flow capabilities of rotation-type mixing devices that contribute most effectively to the limited success of these devices as dispersive mixers.

U.S. Pat. No. 5,451,106 discloses an extensional flow mixer containing a series of chambers that are separated by several complex convergent/divergent surfaces providing narrow openings between the chambers. The overall direction of flow in the disclosed device is radial as opposed to axial.

U.S. Pat. Nos. 5,904,422 and 5,749,653 disclose continuous squeeze flow mixers in which a reciprocating motion translating member is contained within a chamber with inlet and outlet ports to provide dispersive deformation in the form of a squeezing type flow over a disc contained on the translating member. Although the primary mode of dispersive deformation is biaxial extension, energy dissipation in the form of friction can still occur as a result of slip over the squeezing surface.

U.S. Pat. No. 5,968,018 describes very low viscosity fluids or gasses being forced through several staggered arrays of static orifice plates in order to achieve fluid atomization and/or turbulent mixing associated with high Reynolds number flows. By contrast, the flow associated with polymeric fluids is inherently laminar (non-turbulent) having a low Reynolds number flow. Consequently, the described devices are not pertinent to the mixing of high viscosity polymeric fluids and highly filled polymeric fluids.

U.S. Pat. No. 3,860,218 discloses an apparatus comprising a nozzle block in the form of at least one and preferably a plurality of parallel ducts clamped between a pair of pressure cylinders, between which substances are pushed from one side of the block, through the block to the other. The treatment of a single batch is accomplished by moving the material back and forth between the cylinders.

SUMMARY OF THE INVENTION

The present invention is directed to a cascading orifice mixer which is a semi-continuous, batch mechanical mixer characterized by independent control of the mixing rates and/or total work conditions during each stage of the mixing process capable of being used with both homogenous and heterogenous materials streams.

In accordance with a first aspect of the present invention, an apparatus for mixing a viscoelastic material comprises a plurality of chambers connected in series, including a first chamber, at least one intermediate chamber and a last chamber, each chamber comprising an orifice which provides fluid communication between adjacent chambers thereby defining a substantially unidirectional sequential flow path through the chambers. Each chamber has a variable volume ranging from a minimum volume corresponding to a discharge position wherein the viscoelastic material has been expelled from the chamber and a maximum volume corresponding to a fill position for holding a quantity of the viscoelastic material. The plurality of chambers are adapted to transport the viscoelastic material along the sequential flow path by transporting the viscoelastic material of a filled chamber containing a quantity of viscoelastic material to a next adjacent empty chamber, the filled chamber and the next adjacent empty chamber each being at or near the maximum volume for the respective chamber, wherein the volume of the filled chamber is reduced to at or near the minimum volume thereby forcing the viscoelastic material through the respective filled chamber orifice and into the next adjacent chamber.

In accordance with more specific embodiments, the ratio of the cross-sectional area of each chamber to the cross-sectional area of the respective orifice is from about 2:1 to 100:1. In accordance with certain embodiments of the invention, the cross-sectional area of the chamber ranges from about 5 to 10,000 mm$^2$, more particularly 200 to 400 mm$^2$. In still other certain embodiments of the invention, the cross-sectional shape of the orifice is circular, rectangular, triangular, hexagonal, oval or combinations thereof and, in preferred embodiments of the invention, the cross-sectional shape of the orifice comprises a plurality of intersecting rectangular slits.

In accordance with another aspect of the invention, the chambers are generally cylindrical in shape and each chamber includes a respective movable piston wherein movement of the respective piston results in a change in the volume of the chamber. Typically, the piston within a chamber moves in a direction parallel to the cylinder axis of the respective chamber toward and away from the respective orifice. In accordance with more particular aspects of the invention, the cylinder axis of one chamber is substantially orthogonal to the cylinder axis of the next adjacent chamber.

Additionally, the present invention relates to a process for mixing a viscoelastic material, in which the process comprises the steps of:

(a) providing a cascading orifice mixer including a plurality of chambers connected in series, each chamber comprising an orifice wherein the orifice provides fluid communication between adjacent chambers thereby defining a substantially unidirectional sequential flow path through the plurality of chambers, each chamber having a variable volume ranging from a minimum volume to a maximum volume;

(b) charging the first chamber with a quantity of viscoelastic material and optionally other ingredients to be mixed;

(c) reducing the volume of the first chamber to force the viscoelastic material through the orifice into the next adjacent chamber;

(d) reducing the volume of the chamber containing the viscoelastic material to force the material through the respective chamber orifice into the next adjacent chamber; and (e) repeating step (d) a predetermined number of times based on the number of chambers.

In accordance with certain aspects of the invention, the viscoelastic material may be selected from the group consisting of polymers, pharmaceuticals, foodstuffs, cements, inks, paints, solutions, suspensions, pastes, blends and mixtures thereof.

In accordance with another aspect of the invention, a semi-continuous process for mixing a viscoelastic material comprises repeating steps of (b) through (e) wherein the viscoelastic material added in subsequent steps of the process may be the same or different as that added in previous steps.

In accordance with yet another aspect of the present invention, a process for mixing a viscoelastic material comprises forcing the viscoelastic material through a plurality of chambers connected in series, wherein adjacent chambers are separated by an orifice which provides fluid communication between adjacent chambers thereby subjecting the viscoelastic material to extensional deformation during each passage of the material from one chamber through the orifice to the adjacent chamber. The viscoelastic material is transported through at least three chambers, each chamber having a variable volume ranging from a minimum volume to a maximum volume and the viscoelastic material is forced through the orifice by reducing the variable volume of the respective chamber from the maximum volume to the minimum volume.

DETAILED DESCRIPTION OF THE INVENTION

Figure 1:
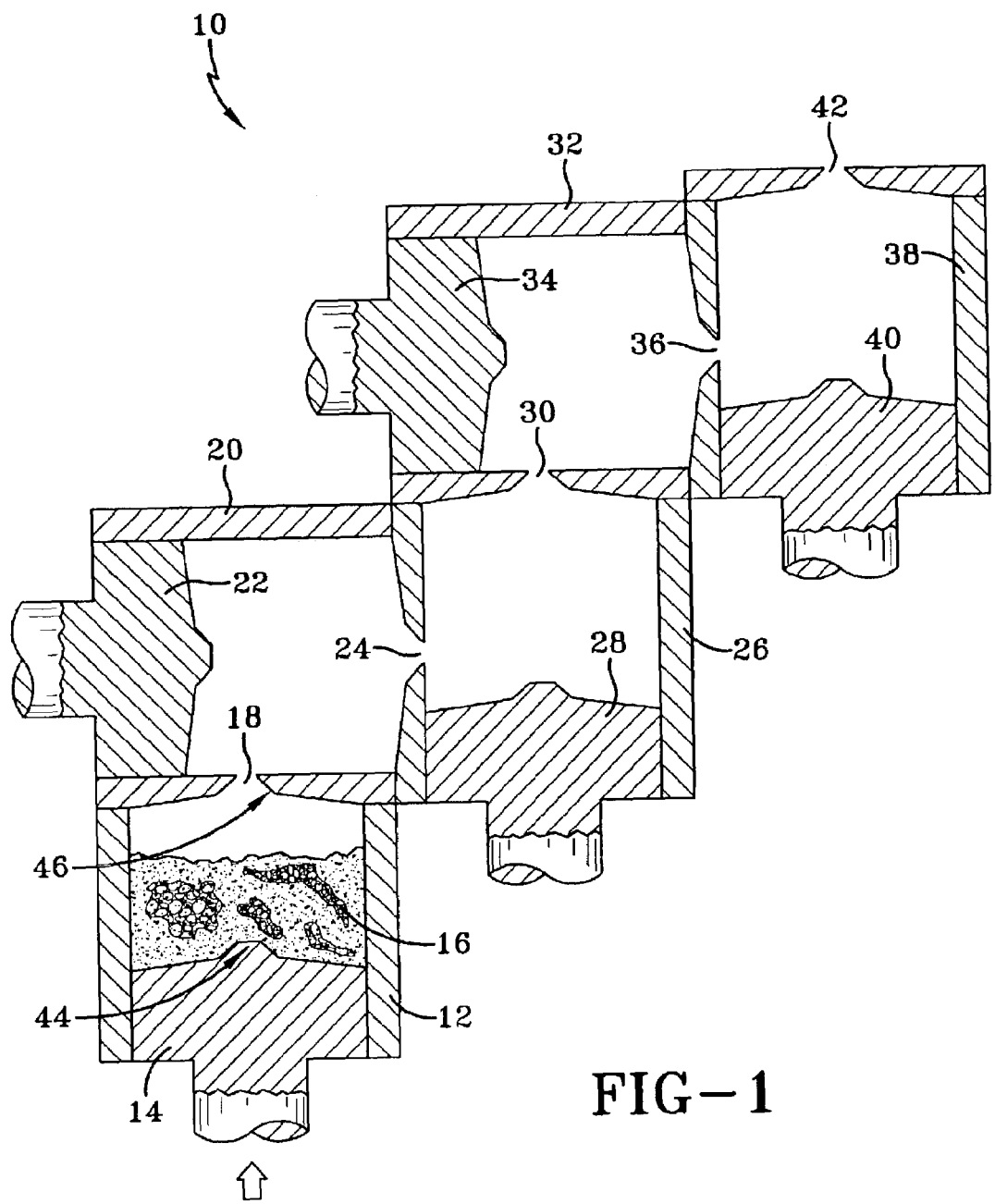
FIG. 1 is a cross-sectional view of a cascading orifice mixer in accordance with one aspect of the present invention.

In accordance with one embodiment of the invention as illustrated in FIG. 1, the cascading orifice mixer 10 includes a plurality of chambers connected in series wherein each chamber comprises an orifice which provides fluid communication between adjacent chambers. As illustrated in the drawings, the chambers 12, 20, 26, 32 and 38 are generally cylindrical and include respective movable pistons 14, 22, 28, 34, and 40 and also include respective orifices 18, 24, 30, and 36 providing fluid communication between adjacent chambers and orifice 42 at the outlet of the last chamber 38. Although the illustrated embodiment describes the orifice as providing direct fluid communication from one chamber to the next adjacent chamber, the orifice may also lead to a narrow passageway connecting one chamber to the next chamber. This construction is also within the scope of the present invention as the orifice provides fluid communication between chambers.

Movement of the pistons results in a change in the volume of the respective chamber. Each of the pistons may be connected to a respective drive means (not shown) for actuating and moving a respective piston. The drive means may in turn be connected to an appropriate controller (not shown) for actuating the drive means. The controller is operably connected with each drive means for actuating the drive means according to an appropriate sequence.

The general structure of the chambers can be described by reference to first chamber 12 as shown in FIG. 1, wherein the piston 14 travels in a direction parallel to the cylinder axis of the chamber 12. The orifice 18, in the embodiment shown in FIG. 1, is coaxial with the cylinder axis of the chamber 12. The orifice 18 may be provided with a tapered entrance angle of, for example, from about 30°–179°, thereby creating a tapered throat 46 leading from the first chamber 12 into the next adjacent chamber 20. Furthermore, piston 14 may be provided with a projection 44 at a separate end which fits into and substantially corresponds to tapered throat 46 of the orifice 18. The projection 44 is provided to minimize dead volume and maximize removal of viscoelastic material from a respective chamber.

The cylinder axis of the first chamber 12 is orthogonal to the cylinder axis of the next adjacent chamber 20 which in turn is orthogonal to the cylinder axis of the next adjacent chamber 26 and the orthogonal relationship of adjacent chambers continues for remaining chambers in the orifice mixer 10. Although the illustrated embodiment describes adjacent chambers as being orthogonal to one another, other orientations are also possible and are within the scope of the present invention.

The configuration of the cascading orifice mixer 10 is illustrated at various stages during a typical mixing operation as set forth in FIG. 1 to FIG. 4. As illustrated in FIG. 1, the first chamber 12 is charged with a quantity of a composition comprising a viscoelastic material 16 including the various raw materials or components to be mixed. The raw ingredients may be placed in the first chamber 12 via a sealable access port (not shown) flush with the chamber wall. Alternative measures for introducing the raw ingredients into the first chamber 12 can also be employed. The variable volume of chamber 12 will typically be at or near its maximum volume when the chamber is charged with the viscoelastic material and other raw materials. Likewise, the variable volume of the next adjacent chamber 20 is also at or near its maximum volume.

Figure 2:
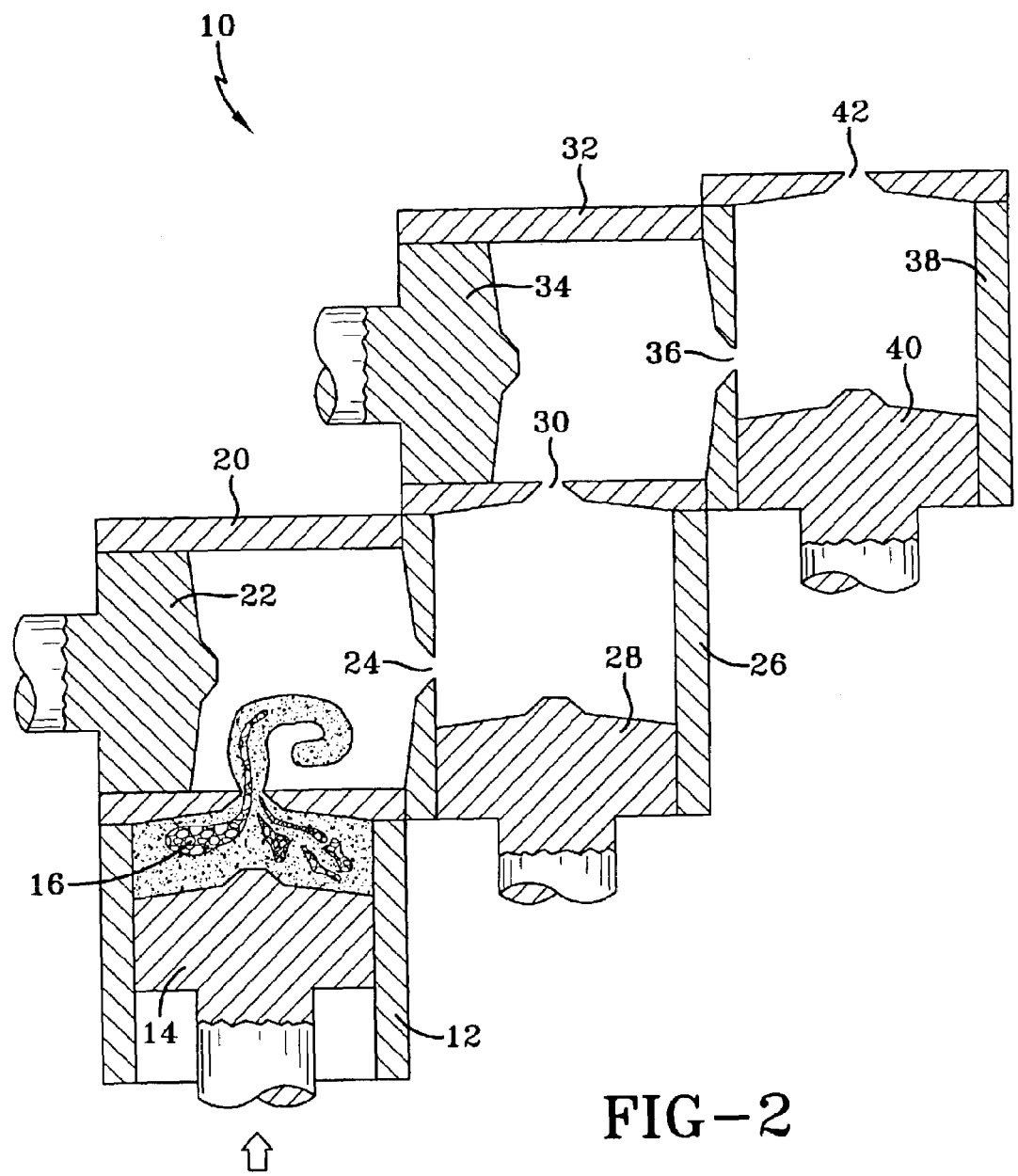
FIG. 2 illustrates the configuration of the mixing apparatus of FIG. 1 during one process step.
Figure 3:
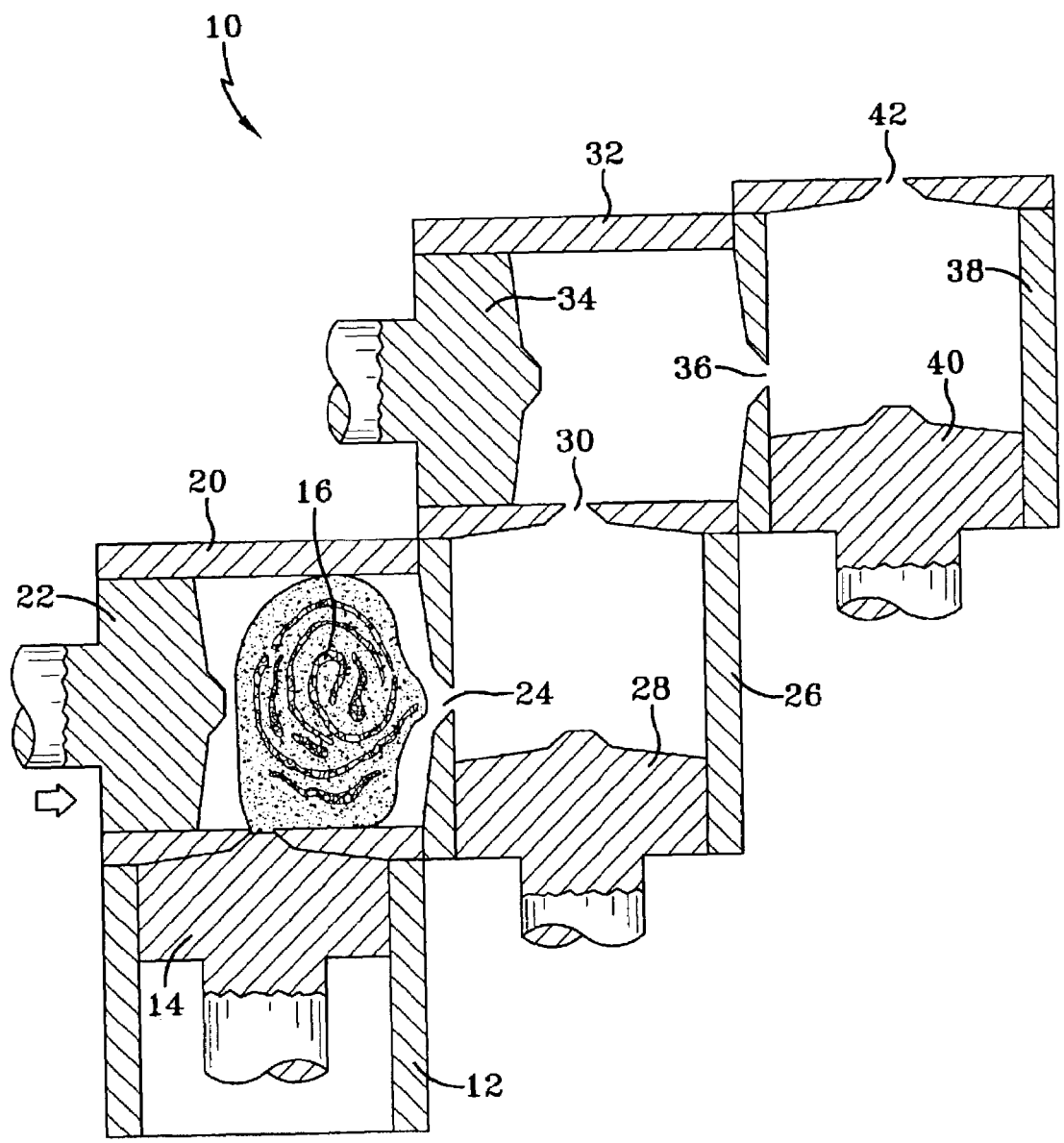
FIG. 3 illustrates the configuration of the mixing apparatus of FIG. 1 during a subsequent process step.

As illustrated in FIG. 2, the viscoelastic material is pushed into the next adjacent chamber 20 by movement of the piston 14 toward the orifice 18 of the first chamber 12. At some point during piston actuation, the raw ingredients of the viscoelastic material in chamber 12 will be restricted from further motion due to the incumbrance of the orifice 18 constriction and compressive packing of the ingredients begins. This compression results in a build-up of pressure within the mixture that can only be relieved by passage through orifice 18 into the next adjacent chamber 20. A transfer of mass through the constriction of orifice 18 results in an increased orientation of the material parallel to the direction of flow as defined by the orifice 18 such that extensional deformation of the material occurs. In the particular embodiment illustrated, both the transfer chamber and orifice are cross-sectionally circular such that the primary mode of dispersive material deformation is uniaxial extension. By way of comparison, if the opening were a rectangular slit, the primary mode of material deformation would be planar extension. Material dispersion is more effective when the mode of deformation is predominantly in extension since the energy losses associated with mechanical friction and slippage are greatly minimized. Therefore, as material passes through the orifice 18 the amount of material deformation imposed is governed simply by the dimensions and geometries of the transfer chamber 12 and orifice opening 18. The piston 14 continues to move until the contents of chamber 12 are substantially completely discharged into the next adjacent chamber 20 as shown in FIG. 3. The complementary shapes of projection 44 and orifice 18 maximizes discharge of the material from chamber 12 to chamber 20. At this point in the mixing process, the first chamber 12 is at or near its minimum volume.

Piston 22 in chamber 20 is then actuated and moves in a direction toward orifice 24 thereby reducing the volume of chamber 20 and transferring the partially mixed material through orifice 24 into the next adjacent chamber 26. The stretching and folding of material exiting each orifice leads to rapid dispersion of material with each successive chamber transfer. As material is being discharged from chamber 20, piston 14 in chamber 12 is returned to its original position wherein the variable volume of chamber 12 is at or near its maximum such that fresh raw ingredients may be reintroduced into chamber 12. After expelling the contents of chamber 20 into chamber 26, piston 28 is then actuated so as to reduce the variable volume of chamber 26 and transfer the material through orifice 30 and into chamber 32. Piston 22 is then returned to its original position thereby increasing the variable volume of chamber 20 to at or near its maximum so that the contents of chamber 12 may be transferred through orifice 18 and into chamber 20 to begin another cycle of the mixing process. Accordingly, cycles are sequentially repeated such that material cascades from one chamber to a next adjacent chamber undergoing highly dispersive extensional deformation with each chamber transfer, thus creating a semi-continuous mixing scheme.

Figure 4:
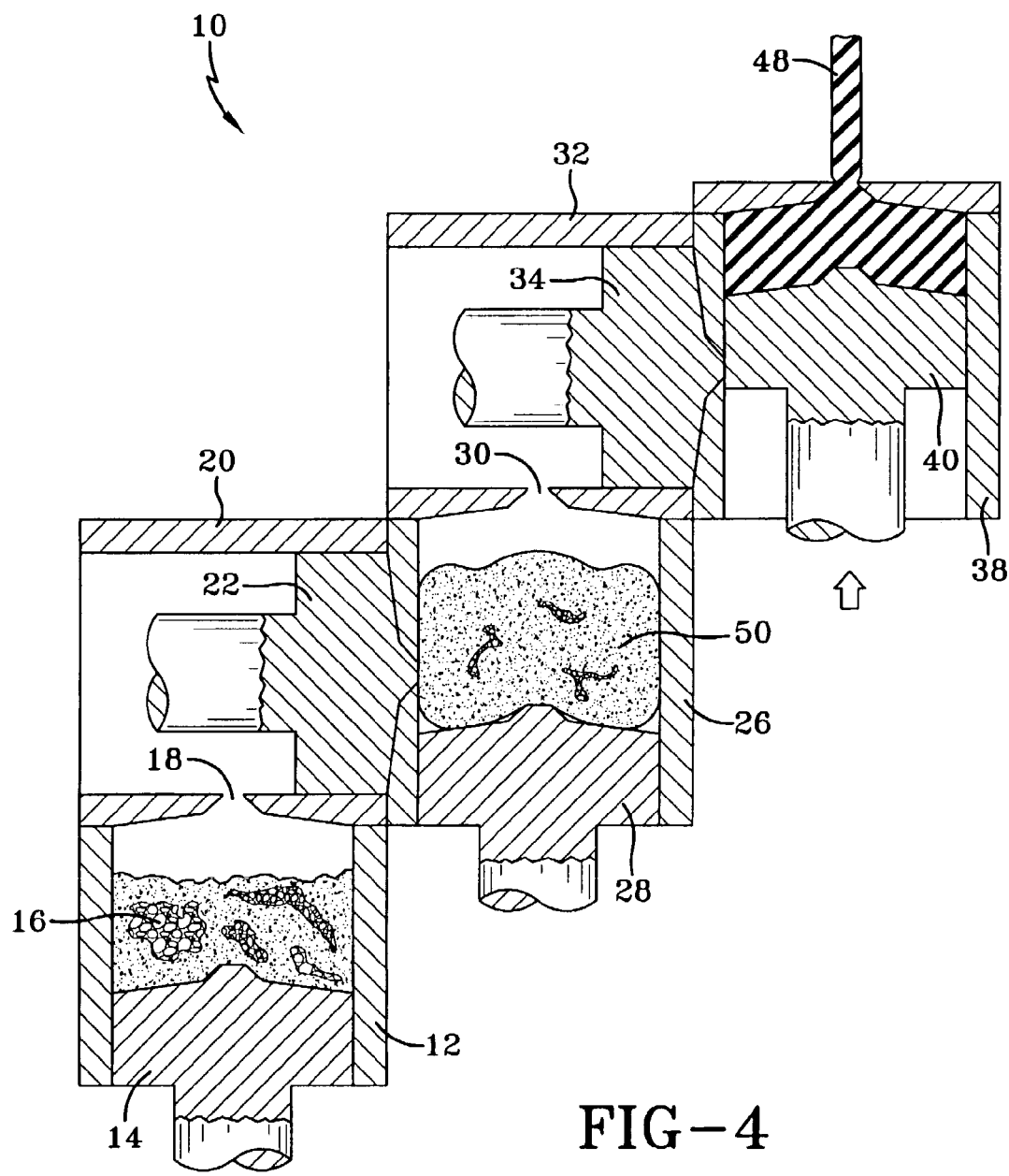
FIG. 4 illustrates the configuration of the mixing apparatus of FIG. 1 during another process step showing ejection of a fully mixed material and other viscoelastic materials at various stages in the mixing operation.

FIG. 4 illustrates the final chamber transfer for the five chamber embodiment described herein where the now fully mixed initial viscoelastic material 48 is discharged from the mixer for subsequent shaping and/or handling processes while chambers 12 and 26 contain viscoelastic materials in different stages of mixing, namely unmixed raw ingredients 16 in chamber 12 and partially mixed material 50 in chamber 26.

It should be noted that the ratio of the cross-sectional area of the chamber to the minimum opening cross-sectional area of the orifice is an important factor in obtaining a good mixing effect. In accordance with particular embodiments of the present invention, the ratio of the cross-sectional area of a particular chamber to the cross-sectional area of the respective orifice is from about 2:1 to 100:1.

The cross-sectional area of the chamber may vary over a wide range. In accordance with particular embodiments the cross-sectional area of the chamber may range from about 5 to 10,000 $mm^2$, more particularly from 200 to 400 $mm^2$. The dimensions of any particular chamber in the cascading orifice mixer may be the same or different from other chambers in the mixer. The number of chambers in a mixer is not particularly limited and depends on the number of dispersive extensional deformations required to adequately mix the viscoelastic material. In accordance with particular embodiments of the present invention, the cascading orifice mixer comprises from about 1–100, more particularly from about 1–50, intermediate chambers or from 3–102, more particularly 3–52 total chambers. Furthermore, although the illustrated embodiment describes the chambers as being cylindrical in shape, other geometric configurations can also be used.

The cross-sectional area of the orifice may also vary over a wide range. However, if the minimum opening cross-sectional area of the orifice is too large, the viscoelastic material is not fully elongated. On the other hand, if the minimum cross-sectional area is too small, it is likely that components of the viscoelastic material may become clogged and also it is likely that the back pressure will become undesirably high. The cross-sectional shape of the orifice portion can be in any form such as, for example, circular, rectangular, triangular, hexagonal, oval and combinations thereof. In accordance with a particular embodiment of the present invention, the cross-sectional shape of the orifice comprises a plurality of intersecting rectangular slits.

Any type of flowable viscoelastic material may be mixed using the process of the invention. Solids, liquids, gases or combinations thereof may be mixed, provided the overall mixture is flowable. Examples of such materials include, but are not limited to, polymers, pharmaceuticals, foodstuffs, cements, inks, paints, solutions, suspensions, pastes, blends and mixtures thereof. The invention is particularly useful for mixing highly viscous materials with solids. For example, the present invention is particularly useful for mixing a polymer compound with a solid additive or a filler material.

It is also within the scope of the present invention to provide access ports in any or all of the chambers of the cascading orifice mixer such that additional compounds or ingredients may be added at various stages during the mixing process. The cascading orifice mixer described herein may be particularly useful when mixing two components that are not easily homogenized. With such materials it may also be desirable to add one material slowly to the other, such as by adding one of the materials in a series of small doses to the other material. This can be accomplished with the present invention by utilizing separate access ports in one or more of the intermediate or last chambers. The sequential addition of materials may be beneficial for the addition of materials that must be added at or near the end of the mixing operation. Such materials may be stable for only short residence times.

The present invention also provides a semi-continuous mixing operation that greatly reduces or eliminates downtime associated with changeover from one product to another. For example, since the contents of each transfer chamber are entirely expelled to the next adjacent chamber, each cascading transfer chamber may contain completely different compound formulations and ingredients. One particularly useful application for the mixer is in the field of elastomeric processing. Examples of elastomer compounds that may be mixed in accordance with the present invention include natural rubber, polyisoprene, butyl and halobutyl rubber, polychloroprene, EPDM, styrene butadiene and polybutadiene rubbers and mixtures thereof. Various commercial products are formed of elastomeric materials compounded with a variety of particulate fillers. One application for these filled elastomeric compounds is in the production of tires. Different formulations are used for individual components of the tire. Accordingly, one particularly useful aspect of the present invention as it relates to the manufacture of tires is that one chamber may contain an elastomeric tire tread compound while an adjacent chamber may contain an elastomeric tire side wall compound.

In accordance with another aspect of the invention, the instantaneous viscosity of a mixture may be assessed on line by monitoring the driving pressure associated with the controlled rate of mass transfer during each successive chamber pass. The nominal applied extensional deformation associated with each chamber pass can be calculated from the following expression for the nominal true (Hencky) strain, $\epsilon_H$, experienced for material passing from the chamber through the orifice;

$$\epsilon_H = \ln(A_c/A_o)$$

wherein $A_c$ is the cross-sectional area of the chamber and $A_o$ is the cross-sectional area of the orifice. The work involved with each chamber pass is simply equal to the load signal on the piston integrated with respect to the stroke of the piston. In such a form, mixing may be governed in a controlled strained deformation mode, a controlled work input mode, or a controlled desired final viscosity mode. In addition, since frictional heat generation is minimized during mixing, the thermal history/temperature profile of a mixture during mixing is decoupled from the actual action of mixing. Thus, mix temperature would not be the controlling/limiting factor for the mixing process.

Although the present invention has been described with reference to a particular embodiment, those of skill in the art will recognize that changes may be made thereto without departing from the scope and spirit of the invention as set forth in the appended claims.

The invention claimed is:

1. An apparatus for mixing a viscoelastic material comprising:
   a plurality of generally cylindrical chambers connected in series, including a first chamber, at least one intermediate chamber and a last chamber, wherein each chamber is oriented such that the cylinder axis of the chamber is substantially orthogonal to the cylinder axis of the next adjacent chamber,
   each chamber comprising an orifice wherein said orifice provides direct fluid communication between adjacent chambers thereby defining a flow path from said first chamber through said at least one intermediate chamber to said last chamber,
   each chamber having a variable volume, said variable volume ranging from a minimum volume to a maximum volume, the plurality of chambers being adapted to transport the viscoelastic material along said flow path by transporting the viscoelastic material from a filled chamber containing a quantity of the viscoelastic material to a next adjacent empty chamber, the filled chamber and the next adjacent empty chamber each being at or near the maximum volume for the respective chamber, wherein the volume of the filled chamber is reduced to the minimum volume thereby forcing the viscoelastic material through the respective filled chamber orifice and into the next adjacent chamber.

2. The apparatus of claim 1 wherein the ratio of the cross-sectional area of each chamber to the cross-sectional area of the respective orifice is from about 2:1 to 100:1.

3. The apparatus of claim 1 wherein the cross-sectional area of the chamber ranges from about 5 to 10,000 mm².

4. The apparatus of claim 1 wherein the cross-sectional shape of the orifice is selected from the group consisting of circular, rectangular, triangular, hexagonal, oval and combinations thereof.

5. The apparatus of claim 4 wherein the cross-sectional shape of the orifice comprises a plurality of intersecting rectangular slits.

6. The apparatus of claim 1 wherein said apparatus comprises from 1 to 50 intermediate chambers.

7. The apparatus of claim 1 wherein each chamber includes a respective movable piston wherein movement of said respective piston results in a change in the volume of the respective chamber.

8. The apparatus of claim 7 wherein said piston within a respective chamber moves in a direction parallel to the cylinder axis of the respective chamber toward and away from said respective orifice.

9. The apparatus of claim 7 wherein said piston includes a projection, said projection having a shape substantially complementary to said orifice.

10. A process for mixing a viscoelastic material, which comprises:
    a) providing a cascading orifice mixer comprising:
       a plurality of chambers connected in series, including a first chamber, at least one intermediate chamber and a last chamber,
       each chamber comprising an orifice wherein said orifice provides fluid communication between adjacent chambers thereby defining a sequential flow path from said first chamber through said at least one intermediate chamber to said last chamber,
       each chamber having a variable volume, said variable volume ranging from a minimum volume to a maximum volume;
    b) charging said first chamber with a quantity of viscoelastic material;
    c) reducing the volume of the first chamber thereby forcing the viscoelastic material through the orifice into the at least one intermediate chamber thereby subjecting the viscoelastic material to extensional deformation;
    d) reducing the volume of the intermediate chamber thereby forcing the viscoelastic material into a next adjacent chamber; and
    e) repeating step d) a predetermined number of times based on the number of intermediate chambers, wherein the primary mode of dispersive deformation is in extension.

11. The process of claim 10 wherein the viscoelastic material is selected from the group consisting of polymers, pharmaceuticals, foodstuffs, cements, inks, paints, solutions, suspensions, pastes, blends and mixtures thereof.

12. The process of claim 11 wherein the viscoelastic material comprised filled polymer compounds.

13. The process of claim 10 further comprising continuously operating said mixer by repeating steps b) through d) using an additional viscoelastic material, wherein said additional viscoelastic material in sequential steps of the process may be the same or different.

14. The process of claim 10 wherein the ratio of the cross-sectional area of each chamber to the cross-sectional of the respective orifice is from about 2:1 to 100:1.

15. The process of claim 11 wherein said chambers are generally cylindrical in shape and each chamber includes a respective moveable piston wherein step c) comprises moving the pistons within the respective chamber.

16. The process of claim 15 wherein each chamber is oriented such that the longitudinal axis of the chamber is substantially orthogonal to the longitudinal axis of the next adjacent chamber.

17. The process of claim 10 wherein the cross-sectional shape of the orifice is selected from the group consisting of circular, rectangular, triangular, hexagonal, oval and combinations thereof.

18. A process for mixing a viscoelastic material comprising forcing said viscoelastic material through a plurality of chambers connected in series, wherein adjacent chambers are separated by an orifice wherein said orifice provides fluid communication between said adjacent chambers thereby subjecting said viscoelastic material to extensional deformation during each passage of the material from one chamber through said orifice to the adjacent chamber wherein said viscoelastic material is transported through at least three chambers, transferring substantially all of the viscoelastic material from one chamber to the adjacent chamber, each chamber having a variable volume, said variable volume ranging from a minimum volume to a maximum volume, and said viscoelastic material is forced through said orifice by reducing the variable volume of a respective chamber from said maximum volume to said minimum volume; wherein the primary mode of dispersive deformation is in extension.

19. The method of claim 18 wherein said viscoelastic material is selected from the group consisting of polymers, pharmaceuticals, foodstuffs, cements, inks, paints, solutions, suspensions, pastes, blends and mixtures thereof.

20. The method of claim 18 wherein the ratio of the cross-sectional area of each chamber to the cross-sectional area of the respective orifice is from about 2:1 to 100:1.

21. The process of claim 18 wherein said chambers are generally cylindrical and each chamber is oriented such that the longitudinal axis of the chamber is substantially orthogonal to the longitudinal axis of the next adjacent chamber.

* * * * *

UNITED STATES PATENT AND TRADEMARK OFFICE
CERTIFICATE OF CORRECTION

PATENT NO. : 7,033,067 B2  
APPLICATION NO. : 10/331524  
DATED : April 25, 2006  
INVENTOR(S) : Martin Lamar Sentmanat It is certified that error appears in the above-identified patent and that said Letters Patent is hereby corrected as shown below:

Col. 8

Line 55 – Change "comprised" to -- comprises --.

Line 62 – After "cross-sectional" (second occurrence) insert -- area --.

Line 64 - After "claim" change "10" to --11 --.

Col. 10

Line 7 - Change "method" to -- process --.

Line 11 – Change "method" to -- process --.

Signed and Sealed this

Fifteenth Day of August, 2006

JON W. DUDAS  
*Director of the United States Patent and Trademark Office*